United States Patent [19]

Probst et al.

[11] Patent Number: 4,918,129

[45] Date of Patent: Apr. 17, 1990

[54] PROCESS FOR THE PRODUCTION OF AQUEOUS POLYMER DISPERSIONS, THE DISPERSIONS OBTAINABLE BY THIS PROCESS AND THEIR USE FOR THE PRODUCTION OF COATINGS

[75] Inventors: Joachim Probst, Leverkusen; Josef Pedain, Cologne; Bruno Börner, Bergisch Gladbach; Adolf Schmidt; Wolfhart Wieczorrek, both of Cologne, all of Fed. Rep. of Germany

[73] Assignee: Bayer Aktiengesellschaft, Leverkusen, Fed. Rep. of Germany

[21] Appl. No.: 309,815

[22] Filed: Feb. 13, 1989

[30] Foreign Application Priority Data

Feb. 26, 1988 [DE] Fed. Rep. of Germany ....... 3806066

[51] Int. Cl.$^4$ .............................................. C08L 75/00
[52] U.S. Cl. .................................. 524/457; 524/714; 526/211
[58] Field of Search ................. 524/714, 457; 526/211

[56] References Cited

U.S. PATENT DOCUMENTS 3,684,759  8/1972  Reiff et al. ........................... 528/73

FOREIGN PATENT DOCUMENTS 1953349  4/1971  Fed. Rep. of Germany .
2402672  4/1979  France .

Primary Examiner—Joseph L. Schofer
Assistant Examiner—Jeffrey T. Smith
Attorney, Agent, or Firm—Connolly and Hutz

[57] ABSTRACT

Aqueous polymer dispersions useful for coating substrates are prepared by polymerization of olefinically unsaturated monomers in aqueous medium in the presence of radical formers and hydrophilically modified, urethane-group-containing emulsifiers having an average molecular weight below 30,000, wherein the urethane-group-containing emulsifiers are oligourethanes having a branched molecular structure which (i) are produced from organic polyisocyanates and organic compounds containing isocyanate-reactive groups with the reactants containing hydrophilic groups or groups convertible into hydrophilic groups and which are monofunctional or difunctional to isocyanate addition reaction, with the molar ratio of monofunctional hydrophilic components to the corresponding difunctional components being at least 2:1, and which (ii) have a content of chemically incorporated hydrophilic groups sufficient to impart the oligourethane solubility or dispersibility in water, with the proviso that, on a statistical average, at least 2.2 terminally incorporated hydrophilic groups are present per molecule.

5 Claims, No Drawings

PROCESS FOR THE PRODUCTION OF AQUEOUS POLYMER DISPERSIONS, THE DISPERSIONS OBTAINABLE BY THIS PROCESS AND THEIR USE FOR THE PRODUCTION OF COATINGS

This invention relates to a new process for the production of aqueous dispersions of polymers of olefinically unsaturated monomers in the presence of radical formers and urethane-group-containing emulsifiers having a branched molecular structure, to the dispersions obtainable by this process and to their use for the production of coatings.

BACKGROUND OF THE INVENTION

It is known that aqueous dispersions of polymers of olefinically unsaturated monomers can be prepared in the presence of water-soluble or water-dispersible oligourethanes of anionic or cationic character (DE-A-1 953 349).

However, it has been found that, in general, the oligourethanes described therein are not entirely suitable for the emulsification of hydrophobic monomers and the resulting polymers. To obtain stable dispersions without any significant loss of polymer and without sedimentation, a low molecular weight emulsifier also has to be added in many cases. The reason for the poor emulsification behavior of these oligourethanes lies in their structure. This is because the oligourethanes used as emulsifiers in DE-A-1 953 349 are compounds having a linear molecular structure which have been prepared using predominantly difunctional (potentially) ionic synthesis components and in which therefore the hydrophilic ionic centers are incorporated within the chain.

BRIEF DESCRIPTION OF THE INVENTION

The object of the present invention is to provide a new process for the production of aqueous polymer dispersions which is not attended by any of the disadvantages mentioned above. This object is achieved by use of special oligourethanes having a branched molecular structure and terminally incorporated hydrophilic centers as emulsifiers in the polymerization of olefinically unsaturated monomers. Specifically, the object is achieved by polymerization of olefinically unsaturated monomers in aqueous medium in the presence of radical formers and hydrophilically modified, urethane-group-containing emulsifiers having an average molecular weight below 30,000.

wherein the urethane-group-containing emulsifiers are oligourethanes having a branched molecular structure which (i) are produced from organic polyisocyanates and organic compounds containing isocyanate-reactive groups with the reactants containing hydrophilic groups or groups convertible into hydrophilic groups and which are monofunctional or difunctional to isocyanate addition reaction, with the molar ratio of monofunctional hydrophilic components to the corresponding difunctional components being at least 2:1, and which (ii) have a content of chemically incorporated hydrophilic groups sufficient to impart to the oligourethane solubility or dispersibility in water, with the proviso that, on a statistical average, at least 2.2 terminally incorporated hydrophilic groups are present per molecule.

DETAILED DESCRIPTION

The present invention relates to a process for the production of aqueous dispersions of polymers by polymerization of olefinically unsaturated monomers in aqueous medium in the presence of radical formers and using hydrophilically modified, urethane-group-containing emulsifiers having an average molecular weight below 30,000 characterized in that the emulsifiers containing urethane groups used are oligourethanes having a branched molecular structure which (i) have been prepared from organic polyisocyanates and organic compounds containing isocyanate-reactive groups using synthesis components which contain hydrophilic groups or groups convertible into hydrophilic groups and which are monofunctional and, optionally, difunctional in the sense of the isocyanate addition reaction, optionally followed by conversion of potential hydrophilic groups into hydrophilic groups, the molar ratio of the monofunctional (potentially) hydrophilic synthesis components to the corresponding difunctional synthesis components being at least 2:1, and which (ii) have a content of chemically incorporated hydrophilic centers which guarantees solubility or dispersibility in water, all or most of the hydrophilic centers being terminally arranged, with the proviso that, on a statistical average, there are at least 2.2 terminally incorporated hydrophilic groups per molecule.

The present invention also relates to the dispersions obtainable by this process and to their use for the production of coatings on any substrates.

The emulsifiers essential to the invention are oligourethanes having an average molecular weight - calculable from the stoichiometry of the starting materials - of below 30,000 and preferably from 1500 to 20,000. The oligourethanes have a branched molecular structure. This means that synthesis components having a functionality of more than 2 in the context of the isocyanate addition reaction are used in their production. In addition, the oligourethanes (in addition to any hydrophilic centers which may be additionally incorporated in the chain) contain terminally incorporated hydrophilic groups, at least 2.2 such terminal hydrophilic groups being present per molecule on a statistical average.

"Hydrophilic groups" are understood to be the following groups:

(a) anionic salt groups, such as carboxylate or sulfonate groups;

(b) cationic salt groups, such as ternary or quaternary ammonium groups or ternary sulfonium groups;

(c) hydrophilic polyether chains of which at least 50% by weight of the chain members consist of ethylene oxide units and the remainder preferably of propylene oxide units.

The ionic hydrophilic groups are preferred to the nonionic hydrophilic groups mentioned under (c). Particularly preferred hydrophilic groups are carboxylate groups.

The oligourethanes must always have a content of hydrophilic groups which guarantees their solubility or dispersibility in water.

The oligourethanes preferably have a content of terminally incorporated ionic groups of from 7.3 to 400 and more especially from 11 to 300 milliequivalents per 100 g.

The oligourethanes are produced by known methods of polyurethane chemistry. Starting materials are
(a) organic polyisocyanates, preferably having a molecular weight in the range from 168 to 1000,
(b) organic compounds containing isocyanate-reactive groups and having a molecular weight in the range from 60 to 10,000 and preferably from 62 to 3000 and
(c) synthesis components containing hydrophilic groups of the type mentioned above or potential hydrophilic groups convertible into such groups.

Suitable organic polyisocyanates (a) are, for example, 4,4'-diisocyanatodiphenyl methane, 2,4- and/or 2,6-diisocyanatotoluene, 4,4'-dicyclohexyl methane, 1-isocyanato-3,3,5-trimethyl-5-isocyanatomethyl cyclohexane (IPDI), 1,6-diisocyanatohexane (HDI), polyisocyanates containing isocyanurate groups, such as for example the polyisocyanate consisting essentially of N,N',N''-tris-(6-isocyanatohexyl)isocyanurate and, optionally, its higher homologs and obtainable by partial trimerization of the isocyanate groups of HDI, polyisocyanates containing urethane groups, such as for example the reaction product of 1 mol trimethylolpropane with 3 mol IPDI or with 3 mol 2,4-diisocyanatotoluene, or even biuret polyisocyanates, such as for example the HDI-based biuret polyisocyanate essentially consisting of N,N',N''-tris-(6-isocyahatohexyl)-biuret and its higher homologs. Mixtures of such polyisocyanates may also be used as component (a) in the production of the oligourethanes.

The compounds (b) containing isocyanate-reactive groups are preferably compounds which do not contain any (potentially) hydrophilic groups of the type mentioned above and which bear at least 1, preferably 2 to 8 and, more preferably, 2 to 4 isocyanate-reactive groups. Examples include:

(b1) the polyester and polyether polyols known per se from polyurethane chemistry which preferably have a molecular weight - calculable from the functionality and the hydroxyl group content - of from 400 to 10000, preferably 400 to 3000 and which are described, for example, in "Kunststoffhandbuch", Vol. 7, "Polyurethane", edited by Dr. Günter Oertel, Carl Hanser-Verlag München, Wien (1983),pages 42 to 61, and which may optionally be used after "preextension" by reaction with substoichiometric quantities of a diisocyanate of the type mentioned by way of example under (a), (b2) polyhydric alcohols which preferably have a molecular weight of 62 to 400 and contain 2 to 3 hydroxyl groups per molecule, such as for example ethylene glycol, propylene glycol, butane-1,4-diol, hexane-1,6-diol, trimethylolpropane, glycerol or mixtures of these chain-extending agents or crosslinkers;

(b3) organic polyamines having a molecular weight in the range from 60 to 4000, such as for example ethylenediamine, hexamethylenediamine, isophoronediamine or "aminopolyethers" having a molecular weight in the range from 400 to 4000, of the type used for example in EP-B 81 701 as starting component in the production of polyurethane plastics.

Component (b) preferably consists of at least one polyester or polyether polyol of the type mentioned by way of example under (b1), optionally in admixture with at least one low molecular weight, polyhydric alcohol of the type mentioned by way of example under (b2).

Suitable synthesis components (c) are, for example, (c1) any compounds containing at least one isocyanate-reactive group and at least one carboxylic acid or sulfonic acid group, of the type mentioned for example in US-PS 3,479,310, column 5, line 7 to column 6, line 9. However, preferred synthesis components (c) are monohydroxymonocarboxylic acids, such as for example 2-hydroxyacetic acid, lactic acid, 4-hydroxybutyric acid or hydroxypivalic acid (=3-hydroxy-2,2-dimethyl propionic acid) and also amino acids, such as for example glutamic acid, 6-aminocaproic acid.

Instead of using the acids mentioned by way of example, it is also possible to use salts thereof with inorganic or organic bases providing they are compatible with the other starting materials. In the case of the aminocarboxylic acids, it is often preferred to use the corresponding salts, particularly with tertiary amines, such as for example triethylamine.

(c2) Tertiary amines containing alcoholic hydroxyl groups, such as for example N,N-dimethyl ethanolamine, N,N-diethyl ethanolamine, 1-dimethylamino-2-propanol or even tertiary amines containing more than 1 isocyanate-reactive group, of the type described by way of example in, for example, US-P 3,479,310, column 4, lines 10 to 63;

(c3) monohydric polyether alcohols of the type used, for example, in US-P 4,237,264 as nonionic-hydrophilic synthesis components. These polyether alcohols are prepared by alkoxylation of suitable starter molecules, such as for example monohydric alcohols, such as methanol, ethanol, n-propanol or n-butanol, the alkoxylating agents used being ethylene oxide or mixtures of ethylene oxide and another alkylene oxide, preferably propylene oxide, although at least 50% by weight of the mixtures consist of ethylene oxide.

Where potentially hydrophilic, i.e. potentially ionic, synthesis components are used as synthesis component (c), the potentially ionic groups are converted into ionic groups after the isocyanate polyaddition reaction by neutralization or quaternization of the potentially ionic groups. Suitable neutralizing or quaternizing agents are, for example, the compounds mentioned by way of example in US-P 3,479,310, column 6, lines 14 to 40. In addition to ammonia, tertiary amines, such as in particular triethylene amine and, N,N-dimethyl ethanolamine, are used for the neutralization of acid groups.

As already mentioned, the synthesis component (c) consists entirely or predominantly of compounds containing only one isocyanate-reactive group. The molar ratio of synthesis components (c) containing an isocyanate-reactive group to synthesis components (c) containing more than one isocyanate reactive group is always at least 2:1.

In addition to the starting components mentioned above, other synthesis components containing isocyanate groups or isocyanate-reactive groups may also be used in the production of the oligourethanes essential to the invention. These other synthesis components include, for example, chain-terminating monoisocyanates, such as methyl isocyanate, ethyl isocyanate or phenyl isocyanate, although they are used in very small quantities because the oligourethanes essential to the invention are compounds having a branched molecular structure, so that the use of such monoisocyanates can only serve the purpose of preventing excessive branching and, hence, gelation of the reaction mixture where synthesis components a) and/or (b) of particularly high functionality are used;

olefinically unsaturated, preferably monofunctional (in the context of the isocyanate addition reaction) compounds, particularly alcohols or amines, such as for example 2-hydroxyethyl, 2-hydroxypropyl, 3-hydroxypropyl, 4-hydroxybutyl or 6-hydroxyhexyl (meth)acrylate, allyl alcohol, methallyl alcohol, allylamine or methallylamine. The co-use of olefinically unsaturated synthesis components such as these leads to oligourethanes essential to the invention which are capable of copolymerization with the olefinically unsaturated monomers used in the process according to the invention. Accordingly, where olefinically unsaturated oligourethanes thus modified are used, dispersions of polymers containing the emulsifiers in chemically incorporated form are formed by copolymerization in the process according to the invention;

blocking agents for isocyanate groups, such as for example ε-caprolactam, butanone oxime, malonic acid diethyl ester or acetoacetic acid ethyl ester. Where blocking agents such as these are used, oligourethanes essential to the invention containing reversibly blocked isocyanate groups are formed: If, at the same time, compounds containing alcoholic hydroxyl groups are used as olefinically unsaturated monomers, it is possible in this way to obtain as the process products according to the invention aqueous dispersions of thermally crosslinkable systems in which the oligourethanes containing blocked isocyanate groups used as emulsifiers also perform the dual function of a crosslinker (blocked polyisocyanate) for the copolymers containing hydroxyl groups.

Since the oligourethanes essential to the invention are compounds having a branched molecular structure which, in addition, contain at least 2.2 terminal hydrophilic groups per molecule on a statistical average, the co-use of the optional, chain-terminating synthesis components mentioned is only possible if, at the same time, the chain-terminating effect of these compounds is taken into account by the use of correspondingly large quantities of higher than difunctional synthesis components (a) and/or (b), so that, even where the chain-terminating synthesis components mentioned are used, the above-mentioned requirements in regard to the branching of the molecules and their content of terminally incorporated hydrophilic groups are satisfied.

The oligourethanes essential to the invention may be prepared, for example, by initially preparing an NCO prepolymer or semiprepolymer from polyisocyanate component (a), component (b) and any difunctional synthesis components (c) used, maintaining an equivalent ratio of isocyanate groups to isocyanate-reactive groups of from 1.5:1 to 30:1 and preferably from 2:1 to 20:1, and subsequently reacting the NCO prepolymer or semiprepolymer thus prepared with the monofunctional synthesis components (c) and, optionally, the other monofunctional compounds containing isocyanate-reactive groups, an equivalent ratio of isocyanate groups of the prepolymer or semiprepolymer to the isocyanate-reactive groups of the monofunctional synthesis components of from about 0.9:1 to 1.1:1 and preferably from 0.96:1 to 1.04:1 generally being maintained.

Any potentially ionic groups present may be converted into ionic groups, for example on completion of these isocyanate addition reactions.

As mentioned above, the type of and quantitative ratios between the starting components are selected so that the oligourethanes obtained have a molecular weight in the range mentioned above and, in addition, have a branched molecular structure. By a "branched molecular structure" is meant the presence on a statistical average of at least 0.2 and preferably at least 1.0 branching sites per molecule. A degree of branching such as this may be established, for example, by the co-use of a corresponding quantity of at least trifunctional synthesis components in the production of the oligourethanes.

Since, as already mentioned, the polyisocyanate component may be used in a considerable excess in the production of the oligourethanes, the "oligourethanes" are often mixtures of (i) reaction products of the monofunctional synthesis components, particularly the monofunctional synthesis components (c), with NCO prepolymers from the starting components (a) and (b) and (ii) reaction products of the monofunctional synthesis components, particularly the monofunctional synthesis components (c), with polyisocyanates (a) which have not been reacted off with starting components (b).

The expression "oligourethanes" is also intended to embrace mixtures such as these. In the case of these mixtures, the observations made in regard to the molecular weight of the oligourethanes apply correspondingly to the average molecular weight (number average) of the individual components present in such mixtures. The figures for the degree of branching and the number of hydrophilic groups terminally incorporated in the oligourethanes are statistical mean values. For example, a reaction product of 1 mol triisocyanate (a) with 3 mol of a monofunctional synthesis component (c), which contains 3 terminally arranged hydrophilic centers, comprises one branching site and 3 terminally arranged hydrophilic centers. The reaction product of (i) 4 mol monofunctional synthesis components (c) with (ii) 1 mol of a (tetrafunctional) prepolymer of 2 mol triisocyanate (a) and 1 mol diol (b) in turn contains on a statistical average 2 branching sites per molecule and 4 terminally arranged hydrophilic centers. An equimolar mixture of these two components would thus contain on a statistical average 1.5 branching sites per molecule and 3.5 terminally arranged hydrophilic centers.

The isocyanate addition reactions mentioned are generally carried out at a temperature in the range. from 20° to 180° C. and preferably at a temperature in the range from 50° to 100° C. in the absence of solvents or in the presence of a suitable solvent, such as for example acetone. In one particularly suitable procedure, the NCO prepolymers or semiprepolymers are prepared from components (a) and (b) in the melt in the absence of a solvent and subsequently dissolved in acetone and reacted with the monofunctional synthesis components. Thereafter the potential ionic groups are optionally converted into ionic groups, for example by addition of a suitable neutralizing agent to the acetone solution and conversion of the acetone solution into an aqueous solution or dispersion by addition of water and removal of the acetone by distillation.

It is of course also possible to use other solvents, such as for example N,N-dimethylformamide, N,N-diethylformamide, methyl ethyl ketone, N-methylpyrrolidone, toluene, ethyl. acetate or mixtures of such solvents. There is even no need to remove the auxiliary solvents where their presence in the products ultimately obtained by the process according to the invention is not regarded as harmful.

To carry out the process according to the invention, i.e. the polymerization reaction of the olefinically unsaturated momoners, the oligourethanes are used as emulsifiers. To this end, they are generally used in the form of 5 to 70% by weight and preferably 20 to 50% by weight aqueous, often colloidal, solutions or aqueous dispersions.

By virtue of their special structure, the oligourethanes essential to the invention, similarly to low molecular weight emulsifiers, have a so-called critical micell concentration; they are therefore suitable for the formation of micell structures in aqueous phase. The critical micell concentrations, which may be determined by surface tension measurements or by conductometric measurements, are generally above 0,5,g and preferably above 1,0 g oligourethane per liter of solution or dispersion. Accordingly, these concentrations represent the lower limit in regard to the concentration of the solutions or dispersions of the oligourethanes used in the process according to the invention.

The process according to the invention, i.e. the polymerization of the olefinically unsaturated monomers, is carried out by the standard methods of emulsion polymerization in the presence of the oligourethanes described above. The ratio of the polymerizable olefinically unsaturated monomers to the oligourethanes is 10–99.5 parts by weight and preferably 50–99 parts by weight to 0.5–90 parts by weight oligourethane and preferably to 1–50 parts by weight oligourethane.

The following are mentioned as examples of olefinically unsaturated monomers:

(a) $\alpha,\beta$-olefinically unsaturated monocarboxylic acids containing 3 to 5 C atoms and their esters or nitriles and amides, such as acrylic, methacrylic and crotonic acid, acrylic and methacrylic acid amides, acrylonitrile and methacrylonitrile, esters of acrylic and methacrylic acid, particularly those with saturated monohydric aliphatic or cycloaliphatic alcohols containing 1 to 20 carbon atoms, such as esters of the acids mentioned with methyl, ethyl, propyl, isopropyl, n-butyl, isobutyl, hexyl, 2-ethylhexyl, octyl, stearyl alcohol, cyclohexanol, methyl cyclohexanol and with benzyl alcohol, phenol, cresol, furfuryl alcohol, monoesters of $\alpha,\beta$-monoolefinically unsaturated monocarboxylic acids containing 3 to 4 carbon atoms with dihydric, saturated aliphatic alcohols containing 2 to 4 C atoms, such as for example 2-hydroxyethyl methacrylate, hydroxypropyl methacrylate, 4-hydroxybutyl methacrylate, 2-hydroxyethyl acrylate, hydroxypropyl acrylate, 4-hydroxybutyl acrylate; glycidyl esters of acrylic and methacrylic acid, such as glycidyl (meth)acrylate; aminoalkyl esters and aminoalkyl amides of acrylic and methacrylic acid, such as 2-aminoethyl (meth)acrylate hydrochloride, N,N-dimethylaminoethyl (meth)acrylate, N,N-dimethylaminopropyl acrylamide. Monomers containing two or more double bonds in the molecule may also be used. In this way, it is possible to obtain highly branched or crosslinked polymer particles, so-called microgels. Suitable monomers such as these are, for example, ethylene glycol diacrylate or methacrylate.

(b) $\alpha,\beta$-olefinically unsaturated dicarboxylic acids containing 3 to 5 C atoms and derivatives thereof, such as fumaric acid, maleic acid, itaconic acid, monoesters and diesters of the above-mentioned dicarboxylic acids containing 1 to 18 C atoms in the alcohol radical, such as maleic acid dimethyl ester, maleic acid diethyl ester, maleic acid dibutyl ester, maleic acid monohexyl ester, maleic acid monocyclohexyl ester.

(c) Monoesters and diesters of vinyl alcohol with carboxylic acids or with hydrohalic acids, vinyl ethers, vinyl ketones, vinyl amides, such as vinyl acetate, vinyl propionate, vinyl laurate, vinyl stearate, vinyl benzoate, chlorovinyl acetate, divinyl adipate, vinyl chloride, vinylidene chloride, vinyl ethyl ether, vinyl butyl ether, vinyl ethyl or vinyl isobutyl ether, vinyl ethyl ketone, vinyl formamide, N-vinyl acetamide.

(d) Vinyl compounds of aromatics and heterocycles, such as styrene, $\alpha$-methyl styrene, vinyl toluene, p-chlorostyrene, divinylbenzene, 2-vinyl pyrrolidone, 2-vinyl pyridine.

(e) N-methylol ethers of acrylic and methacrylic acid amide corresponding to general formula I

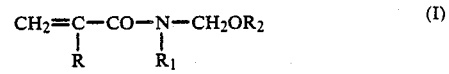

in which R is hydrogen or methyl, $R_1$ is hydrogen, alkyl, aralkyl or aryl, $R_2$ is alkyl or cycloalkyl, such as for example methyl, ethyl, n-propyl, isopropyl, n-butyl, isobutyl, cyclohexyl (cf. DE-B-035 363), also the non-etherified N-methylol compounds of acrylic and methacrylic acid amide.

(f) Mannich bases of acrylic acid and methacrylic acid amide corresponding to general formula (II)

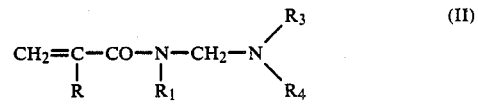

in which R and $R_1$ have the same meaning as in formula I and $R_3$ and $R_4$ represent alkyl, cycloalkyl or, together, a heterocylic radical, such as the morpholine radical. Suitable compounds of this type are named in DE-B-1 102 404.

(g) Halomethylcarbonyl-terminated acrylic and methacrylic acid derivatives corresponding to general formula (III)

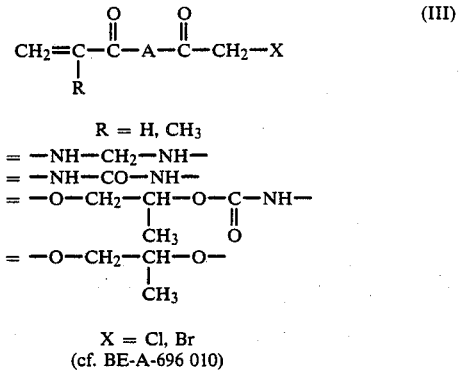

(cf. BE-A-696 010)

(h) Allyl compounds, such as triallyl cyanurate, triallyl phosphate, allyl alcohol, allyl amine.

(i) Monoolefinically unsaturated aliphatic hydrocarbons containing 2 to 6 C atoms, such as ethylene, propylene, butylene, isobutylene.

(j) Conjugated diolefins containing 4 to 6 C atoms, such as butadiene, isoprene, 2,3-dimethyl butadiene, chlorobutadiene.

(k) Norbornene and hydroxymethyl norbornene. It is preferred to use acrylic and methacrylic acid esters containing 1 to 12 C atoms in the alcohol radical, acrylic acid, methacrylic acid and also the $C_2$–$C_4$ hydroxyalkyl esters of these acids, styrene, acrylonitrile and methacrylonitrile, vinyl acetate, vinyl propionate, vinyl chloride, vinylidene chloride, ethylene or propylene in conjunction with one or more of the monomers mentioned.

The polymerization is generally carried out at temperatures of 10° to 150° C. and preferably at temperatures of 40° to 130° C.

Suitable initiators are initiators which decompose into radicals, generally being used in a quantity of 0.05 to 5% by weight, based on the monomers. Such initiators are, for example, organic peroxides, such as for example lauroyl peroxide, cyclohexanone hydroperoxide, tert.-butyl peroctoate, tert.-butyl perpivalate, tert.-butyl perbenzoate, dichlorobenzoyl peroxide, benzoyl peroxide, di-tert.-butyl peroxide, tert.-butyl hydroperoxide, cumene hydroperoxide, peroxycarbonates, such as diisopropyl peroxydicarbonate, dicyclohexyl peroxydicarbonate, diisoctyl peroxydicarbonate, sulfonyl peroxides, such as acetyl cyclohexyl sulfonyl peracetate, sulfonyl hydrazides, azo compounds, such as azodiisobutyroldinitrile, and water-soluble azo compounds of the type described, for example, in DE-A-2 841 045.

Inorganic peroxides, such as hydrogen peroxide, potassium peroxodisulfate and ammonium peroxodisulfate, are also suitable.

The initiators decomposing into radicals may be used on their own or even in conjunction with reducing agents or heavy metal compounds. Examples of such compounds are sodium or potassium pyrosulfite, formic acid, ascorbic acid, thiourea, hydrazine and amine derivatives, Rongalite. The heavy metal compounds may be present both in oil-soluble form and in water-soluble form. Water-soluble heavy metal compounds are, for example, silver nitrate, halides or sulfates of divalent or trivalent iron, cobalt, nickel, salts of titanium or vanadium in relatively low valency stages. Oil-soluble heavy metal compounds are, for example, cobalt naphthenate or the acetyl acetone complexes of vanadium, cobalt, titanium, nickel or iron.

The polymerization is generally carried out at pH values of 2 to 10 and preferably 4 to 9. pH values below 7 are preferred where cationic oligourethanes are used while pH values above 6 are preferred where anionic oligourethanes are used. Where acidic groups are present in the reaction mixture, pH values within the ranges mentioned above are often established by the addition of aqueous ammonia.

To regulate the molecular weights of the polymers, it is possible to use standard regulators, for example n-dodecyl mercaptan, t-dodecyl mercaptan, diisopropyl xanthogene disulfide, thioglycol and thioglycerol. They are generally added in quantities of 0.1 to 2% by weight, based on the monomer mixture.

The emulsion polymerization in aqueous medium may be carried out by known polymerization processes both non-continuously and also continuously or by the feed process.

The continuous process and the feed process are particularly preferred. In the feed process, water is initially introduced together with part or all of the emulsifier system and optionally part of the monomer mixture in a nitrogen atmosphere, heated to the polymerization temperature and the monomer mixture and also the initiator and, optionally, emulsifier added dropwise over a period of 0.5 to 10 hours and preferably over a period of 1 to 6 hours.

After a while, the reaction is reactivated and continued to a conversion of approximately 99.0% to 99.9%. Residual monomers and any organic solvents still present may be removed by distillation in vacuo after the emulsion polymerization, optionally together with the water present or with part of the water present. More water may then be added, so that 10 to 60% by weight and preferably 20 to 50% by weight dispersions are ultimately obtained as the products of the process.

The mean particle diameters, as measured by laser The mean particle diameters, as measured by quasielastic light scattering are between 20 and 1000 nm and preferably between 50 and 500 nm, depending on the reaction conditions. Dispersions having particle sizes below 50 nm appear transparent while dispersions containing larger particles appear increasingly cloudy.

The dispersions may be mixed with dispersions of like charge, for example with polyvinyl acetate, polyethylene, polystyrene, polybutadiene, polyvinyl chloride and polyacrylate dispersions.

Finally, fillers, plasticizers, pigments, hydrofluoric acid and silica sols, aluminium, clay, asbestos dispersions, may also be incorporated.

The products obtained by the process according to the invention are stable, storable and transportable aqueous dispersions and may be processed by shaping at any later stage. In general, they dry directly to form dimensionally stable plastic coverings. The process products may also be shaped in the presence of crosslinking agents known per se. To this end, polyfunctional crosslinking substances are added to the modified vinyl polymers during the process, effecting chemical crosslinking after evaporation of the solvent present, if any, at room temperature or elevated temperature. Examples of such polyfunctional crosslinking substances are sulfur, free and partially or completely masked polyisocyanates. carbodiimides, formaldehyde or formaldehyde donors, melamine resins, methylol compounds and ethers thereof, organic and inorganic peroxides.

As already mentioned, dispersions crosslinking spontaneously at elevated temperature may be obtained when, in the production of the oligourethanes, blocked isocyanate groups are incorporated in the oligourethanes by the co-use of blocking agents for isocyanate groups of the type mentioned.

The optionally dissolved or suspended crosslinking agents, fillers, pigments and other additives may be incorporated during the process.

The aqueous dispersions obtained may have a liquid or paste-like consistency and are stable without the addition of an emulsifier, although corresponding cationic, anionic or neutral emulsifiers and protective colloids and also thickeners may be added in the course of the process, including acid- or ammonia-digested casein, soaps, invert soaps, alkylsulfonates, polyvinyl alcohol, ethoxylated phenols, oleyl alcohol polyglycol ethers, ethoxylated polypropylene glycol, or natural products, such as gelatin, gum arabic, tragacanth, fish glue. The function of additives such as these is, above all, additionally to reduce the surface tension of the aqueous dispersions. They also influence the stability and coagulatability of the dispersions.

However, it is emphasized that the addition of such emulsifiers typically used in emulsion polymerization is by no means necessary in the process according to the invention. The aqueous dispersions obtainable by the process according to the invention may be used for a variety of applications.

Thus, it is possible to obtain dip-coated articles, foams by the latex mechanical foam blowing process, coagulates processible on mixing rolls by the addition of an electrolyte to the aqueous dispersions and tack-free and tacky films by evaporation of the water. The process products are suitable for the coating and impregnation of woven and non-woven textiles, leather, metals, ceramics, stone, concrete, bitumen, hard fibers, straw, glass, porcelain, plastics of various kinds, glass fibers, for antistatic and crease-resistant finishing, as binders for nonwovens, adhesives, primers, laminating agents, hydrophobicizing agents, plasticizers, binders, for example for cork powder or wood powder, glass fibers, asbestos, plastic or rubber waste, ceramic materials, as auxiliaries in cloth printing, as additives for polymer dispersions, as sizes and for finishing leather.

The dispersions are preferably-used for aqueous lacquer systems.

EXAMPLES

I. Production of oligourethanes essential to the invention

Oligourethane 1

170 g of a hydroxypolyester of adipic acid, neopentyl glycol and hexanediol (molar ratio of the diols 1:1) having an average molecular weight of approx. 1700 g $mol^{-1}$ are reacted in 5 hours at 100° C. with 160 g of a polyisocyanate which has been obtained by partial trimerization of the NCO groups of hexamethylene diisocyanate and subsequent removal of free hexamethylene diisocyanate and which has an NCO content of approximately 21%. A prepolymer having an NCO content of approximately 7.5% is obtained and is dissolved in 225 g acetone, 70.8 g hydroxypivalic acid in 250 g acetone being added to the resulting solution. After mixing, 50.5 g triethylamine are added, the mixture heated under reflux to the boiling temperature of the acetone until no more NCO groups can be detected in the solution and, finally, 677 g deionized water are added with intensive stirring. Acetone is then distilled off under reduced pressure. An approx. 40% aqueous solution of the oligourethane 1 is obtained. The surface tension measurement carried out by the ring method using a tensiometer gives a critical micell concentration of approx. 11.3 g/l.

Oligourethane 2

The procedure is the same as for the production of oligourethane 1 using the same starting products. Before the hydroxypolyester is reacted with the polyisocyanate, the polyisocyanate is "preextended" with a substoichiometric quantity of hexamethylene diisocyanate. Oligourethane 2 consists of 226 g hydroxypolyester (as for oligourethane 1), 5.5 g hexamethylene diisocyanate, 160 g-polyisocyanate, 70.8 g hydroxypivalic acid, 50.5 g triethylamine. The product is also dissolved in deionized water to form an approximately 40% solution.

The critical micell concentration determined by surface tension measurement is 14.9 g/l.

Process according to the invention

EXAMPLE 1

317 g deionized water are introduced into a 2 liter four-necked flask equipped with an effective stirrer, reflux condenser, gas inlet and gas outlet. The water is then thoroughly boiled under nitrogen and cooled to 60° C. 350 g of a 40% aqueous solution of oligourethane 1 are then added, after which nitrogen is passed over.

A mixture of 7 g methyl methacrylate and 7 g n-butyl acrylate (monomer mixture I) is then rapidly added dropwise at the same time as 10.4 g of a 2% by weight aqueous ammoniacal solution of the initiator 4,4'-azobis-(4-cyanopentanecarboxylic acid) (initiator solution I). After a reaction time of 30 minutes, a monomer mixture of 63 g methyl methacrylate and 63 g n-butyl acrylate (monomer mixture II) and also 102 g of a 1% by weight aqueous ammoniacal solution of 4,4'-azobis - (4-cyanopentanecarboxylic acid) (initiator solution II) are added dropwise at the same time, but separately, over a period of 3 hours. After an additional reaction time of 2 hours, the reaction mixture is reactivated with 10.6 g of a 3% by weight aqueous ammoniacal solution of the same initiator. Polymerization is then completed over a period of 5 hours. Approx. 100 ml water and residual monomers are then distilled off in a water jet vacuum and replaced by 100 ml deionized water. The concentration of the aqueous dispersion is 31.0% by weight, the pH value 7.3 and the mean-particle diameter (as measured by quasielastic light scattering) 103±3 nm. No coagulate was found.

EXAMPLES 2 and 3

The procedure is as in Example 1, except that in Examples 2 and 3 the ratio by weight of emulsifier (oligourethane 1) to monomers is reduced to 4:6 or 3:7. Further particulars are shown in Table 1 which also shows the physical-chemical characteristic data of the aqueous dispersions.

TABLE 1

| Initially introduced | Example 2 | Example 3 |
|---|---|---|
| Deionized water [g] | 362 | 404 |
| Oligourethane 1 (40%) [g] | 280 | 210 |
| Monomer mixture I | | |
| Methyl methacrylate [g] | 8 | 10 |
| n-butyl acrylate [g] | 8 | 10 |
| Initiator solution I | | |
| 4,4'-azobis-(4-cyanopentane carboxylic acid) [g] | 0.2 | 0.2 |
| 0.5% aqueous solution of ammonia [g] | 10.2 | 10.2 |
| Monomer mixture II | | |
| Methyl methacrylate [g] | 76 | 88 |
| n-butyl acrylate [g] | 76 | 88 |
| Initiator solution II | | |
| 4,4'-azobis-(4-cyanopentane carboxylic acid) [g] | 1 | 1 |
| 0.25% aqueous solution of ammonia [g] | 101 | 101 |
| Reactivator solution | | |
| 4,4'-azobis-(4-cyanopentane carboxylic acid) [g] 0.3 | 0.3 | |
| 0.75% aqueous solution of ammonia [g] | 10.3 | 10.3 |
| Concentration [% by weight] | 30.8 | 29.7 |
| pH value | 8.0 | 8.4 |
| Mean particle diameter [nm] | 356 ± 7 | 416 ± 9 |
| Coagulate | — | — |
| Film properties | clear, soft elastic film | clear, soft elastic film |

EXAMPLES 4–6

The procedure is as in Example 1, except that the ratio by weight of emulsifier (oligourethane 1) to monomers is reduced to 3:7. Further particulars are shown in Table 2 which also show the physical-chemical characteristic data of the aqueous dispersions.

TABLE 2

| Initially introduced | Example 4 | Example 5 | Example 6 |
|---|---|---|---|
| Deionized water [g] | 295 | 295 | 295 |
| Oligourethane 1 (40%) [g] | 300 | 300 | 300 |
| Monomer mixture I | | | |
| Styrene [g] | 10 | 10 | 10 |
| Methyl methacrylate [g] | 10 | 10 | 10 |
| n-butyl acrylate [g] | 8 | 8 | 8 |
| Initiator solution | | | |
| 4,4'-azobis-(4-cyanopentane carboxylic acid) [g] | 0.2 | 0.2 | 0.2 |
| 0.5% aqueous solution of ammonia [g] | 10.2 | 10.2 | 10.2 |
| Monomer mixture II | | | |
| Styrene [g] | 75 | 67 | 60 |
| Methyl methacrylate [g] | 75 | 67 | 60 |
| n-butyl acrylate [g] | 72 | 72 | 72 |
| 2-hydroxyethyl methacrylate [g] | 31 | 46 | 61 |
| Initiator solution II | | | |
| 4,4'-azobis-(4-cyanopentane carboxylic acid) [g] | 1 | 1 | 1 |
| 0.25% aqueous solution of ammonia [g] | 101 | 101 | 101 |
| Reactivator solution | | | |
| 4,4'-azobis-(4-cyanopentane carboxylic acid) [g] | 0.3 | 0.3 | 0.3 |
| 0.75% aqueous solution of ammonia [g] | 10.3 | 10.3 | 10.3 |
| Concentration [% by weight] | 41.1 | 41.0 | 40.8 |
| pH value | 7.1 | 7.0 | 7.0 |
| Mean particle diameter [nm] | 79 ± 3 | 79 ± 1 | 80 ± 1 |
| Coagulate [g] | — | — | — |
| Film properties | relatively hard, clear film | relatively hard, clear film | relatively hard, clear film |

EXAMPLES 7 to 9

The procedure is as in Examples 4 to 6, except that oligourethane 2 is used instead of oligourethane 1 as the polymeric emulsifier. Further particulars are shown in Table 3 which also shows the physical-chemical data of the aqueous dispersions.

EXAMPLES 10 and 11

Polymerization is carried out under the same conditions as in Examples 7 to 9; further particulars and also the physical-chemical data of the aqueous dispersions are shown in Table 4.

TABLE 3

| Initially introduced | Example 7 | Example 8 | Example 9 |
|---|---|---|---|
| Deionized water [g] | 415 | 445 | 445 |
| Oligourethane 2 (40%) [g] | 100 | 50 | 50 |
| Monomer mixture I | | | |
| Methyl methacrylate [g] | 24 | 25 | — |
| n-butyl acrylate [g] | 12 | 13 | 19 |
| Acrylonitrile [g] | — | — | 19 |
| Initiator solution I | | | |
| 4,4'-azobis-(4-cyanopentane carboxylic acid) [g] | 0.5 | 0.5 | 0.5 |
| 0.5% aqueous solution of ammonium [g] | 10.3 | 10.3 | 10.3 |
| Monomer mixture II | | | |
| Methyl methacrylate [g] | 216 | 228 | — |
| n-butyl acrylate [g] | 108 | 114 | 171 |
| Acylonitrile [g] | — | — | 171 |
| Initiator solution II | | | |
| 4,4'-azobis-(4-cyanopentane carboxylic acid) [g] | 2 | 2 | 2 |
| 0.25% aqueous solution of ammonia [g] | 101 | 101 | 101 |
| Reactivator solution | | | |
| 4,4'-azobis-(4-cyanopentane carboxylic acid) [g] | 0.5 | 0.5 | 0.5 |
| 0.75% aqueous solution of ammonia [g] | 10.3 | 10.3 | 10.3 |
| Concentration [% by weight] | 41.2 | 41.8 | 41.0 |
| pH value | 7.0 | 7.0 | 7.0 |
| Mean particle diameter [nm] | 71 | 88 | 100 |
| Coagulate [g] | 0.2 | 2.2 | — |
| Film properties | hard, brittle film | hard, brittle film | hard, brittle film |

TABLE 4

| Initially introduced | Example 10 | Example 11 |
|---|---|---|
| Deionized water [g] | 413 | 413 |
| Oligourethane 2 (40%) [g] | 100 | 100 |
| Monomer mixture I | | |
| Styrene [g] | 14 | 14 |
| Methyl Methacrylate [g] | 14 | 14 |
| n-butyl acrylate [g] | 8 | 8 |
| Initiator solution I | | |
| 4,4'-azobis-(4-cyanopentane carboxylic acid) [g] | 0.5 | 0.5 |
| 1.25% aqueous solution of ammonia [g] | 10.5 | 10.5 |
| Monomer mixture II | | |
| Styrene [g] | 96 | 88 |
| Methyl methacrylate [g] | 96 | 88 |
| n-butyl acrylate [g] | 72 | 72 |
| 2-hydroxyethyl methylacrylate [g] | 61 | 76 |
| Initiator solution II | | |
| 4,4'-azobis-(4-cyanopentane carboxylic acid) [g] | 2 | 2 |
| 0.5% aqueous solution of ammonia [g] | 102 | 102 |
| Reactivator solution | | |
| 4,4'-azobis-(4-cyanopentane) carboxylic acid) [g] | 0.5 | 0.5 |
| 1% aqueous solution of ammonia [g] | 10.5 | 10.5 |
| Concentration [% by weight] | 41.7 | 42.0 |
| pH value | 7.5 | 7.5 |
| Mean particle diameter [nm] | 226 ± 4 | 105 ± 1 |
| Coagulate [g] | 2.0 | 3.5 |
| Film properties | relatively hard, clear film | relatively hard, clear film |

Use according to the invention

EXAMPLE 12

The production of a transparent, water-dilutable coating compound based on the dispersion of Example 11 according to the invention is described in the following.

| Compositions of the coating compound: | |
|---|---|
| Dispersion of Example 11 | 76.2 parts by weight |
| Melamine-formaldehyde resin[1] 68% in water | 11.2 parts by weight |
| Surfactant[2], 10% in water | 1.9 parts by weight |
| Levelling agent[3], 50% as supplied | 1.1 parts by weight |
| Deaering agent[4] | 0.8 parts by weight |

-continued

| Compositions of the coating compound: | |
|---|---|
| Ethyl diglycol | 4.4 parts by weight |
| Butyl diglycol | 4.4 parts by weight |
| Solids content | 39% by weight |
| Flow time (DIN 53 211, 4 mm cup) | 18 s |
| pH value | 7.2 |

[1] ® Luwipal 063, a product of BASF AG
[2] Fluorine surfactant TF 929, a product of Bayer AG
[3] ® Byk 301, a product of Byk Chemie GmbH
[4] ® Additol XW 393, a product of Hoechst AG The coating compound may be applied to any substrates by standard methods, for example by spread coating, roll coating, knife coating or spray coating. The substrate may even be one which has already been precoated by the wet-in-wet process, such as for example a pigmented base lacquer.

After airing for 5 minutes at room temperature, the coating is predried for 10 minutes at 80° C. and then stoved for 20 minutes at 40° C. Clear coatings showing satisfactory levelling, high brilliance mechanical film propertied and chemical resistance values are obtained.

After storage for 24 hours, in ambient air, films produced as described above produced the following test results:

| | |
|---|---|
| Layer thickness | 40 μm |
| Pendulum hardness (DIN 53 157) | 168 s |
| Erichsen indentation (DIN 53 156) | 8.5 mm |
| Water resistance, 24 hours under load | unchanged |
| Ethanol resistance, 10 minutes under load | unchanged |
| Xylene resistance, 10 minutes under load | unchanged |

What is claimed is:

1. A process for the production of aqueous dispersions of polymers by polymerization of olefinically unsaturated monomers in aqueous medium in the presence of radical formers and hydrophilically modified, urethane-group-containing emulsifiers having an average molecular weight below 30,000
    wherein the urethane-group-containing emulsifiers are oligourethanes having a branched molecular structure which
    (i) are produced from the reaction of (a) organic polyisocyanates, (b) organic compounds containing isocyanate-reactive groups and (c) organic compounds containing hydrophilic groups or functional groups which are converted into hydrophilic groups by neutralization or quaternization after the isocyanate polyaddition reaction wherein the compounds (c) are monofunctional or a mixture of monofunctional are difunctional compounds relative to the isocyanate addition reaction, with the molar ratio in said mixture of monofunctional hydrophilic reactants to the corresponding difunctional reactants being at least 2:1, and which
    (ii) have a content of chemically incorporated hydrophilic groups sufficient to impart to the oligourethane solubility or dispersibility in water, with the proviso that, on a statistical average at least 2.2 terminally incorporated hydrophilic groups are present per molecule.

2. A process as claimed in claim 1 wherein the oligourethanes contain 2 to 400 milliequivalents per 100 grams of terminally incorporated carboxylate groups.

3. A process as claimed in claim 1 wherein the ratio by weight of the olefinically unsaturated monomers to the oligourethane emulsifiers is from 1:1 to 99:1.

4. A process as claimed in claim 1 wherein the polymerization reaction is carried out noncontinuously, continously or by the feed process at temperatures in the range from 10° to 50° C.

5. Dispersions produced by the process claimed in claim 1.

* * * * *